(12) United States Patent
Lee et al.

(10) Patent No.: US 11,789,316 B2
(45) Date of Patent: Oct. 17, 2023

(54) FRONT LIGHT MODULE AND FOLDABLE DISPLAY DEVICE

(71) Applicant: E Ink Holdings Inc., Hsinchu (TW)

(72) Inventors: Kun-Hsien Lee, Hsinchu (TW); Sheng-Chieh Tai, Hsinchu (TW); Yi-Yu Tsai, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/062,588

(22) Filed: Dec. 7, 2022

(65) Prior Publication Data

US 2023/0229041 A1   Jul. 20, 2023

(30) Foreign Application Priority Data

Jan. 14, 2022 (TW) .................... 111101587

(51) Int. Cl.
*G02F 1/1335* (2006.01)
*G02F 1/1333* (2006.01)

(52) U.S. Cl.
CPC .... *G02F 1/133616* (2021.01); *G02F 1/13356* (2021.01); *G02F 1/133305* (2013.01); *G02F 1/133524* (2013.01); *G02F 2201/50* (2013.01); *G02F 2202/02* (2013.01); *G02F 2202/09* (2013.01); *G02F 2202/28* (2013.01)

(58) Field of Classification Search
CPC ........... G02F 2202/28; G02F 1/133616; G02F 1/133615; G02F 1/133305; G02F 1/133524; G09F 9/301; H10K 77/111; H10K 2102/311; G06F 1/1652; G06F 2203/04102
See application file for complete search history.

(56) References Cited

U.S. PATENT DOCUMENTS

| | | | |
|---|---|---|---|
| 8,206,536 B2 | 6/2012 | Kim et al. | |
| 9,263,709 B2 | 2/2016 | Lee et al. | |
| 9,615,473 B2 | 4/2017 | Kim | |
| 9,731,477 B1* | 8/2017 | Menon | B32B 37/0015 |
| 9,811,188 B1* | 11/2017 | Subbarayan | G02F 1/167 |
| 2005/0099792 A1* | 5/2005 | Matsui | G02B 6/0036 |
| | | | 362/603 |
| 2011/0007380 A1* | 1/2011 | Chen | G02B 6/0053 |
| | | | 359/296 |
| 2015/0205033 A1* | 7/2015 | Hong | G06F 3/042 |
| | | | 345/87 |
| 2019/0331844 A1* | 10/2019 | Du | G02B 6/0038 |

* cited by examiner

*Primary Examiner* — Jia X Pan
(74) *Attorney, Agent, or Firm* — CKC & Partners Co., LLC

(57) ABSTRACT

A front light module includes a foldable light guide plate, a light source, an upper insulating layer, an upper optical adhesive layer, a lower insulating layer, and a lower optical adhesive layer. The top surface and the bottom surface of the foldable light guide plate adjoin the light incident surface of the foldable light guide plate. The light source faces toward the light incident surface. The upper insulating layer is located on the top surface. The upper optical adhesive layer is located on the upper insulating layer, and a storage modulus of the upper optical adhesive layer is less than a storage modulus of the upper insulating layer. The lower optical adhesive layer is located on a bottom surface of the lower insulating layer, and a storage modulus of the lower optical adhesive layer is less than a storage modulus of the lower insulating layer.

16 Claims, 5 Drawing Sheets

FRONT LIGHT MODULE AND FOLDABLE DISPLAY DEVICE

RELATED APPLICATIONS

This application claims priority to Taiwan Application Serial Number 111101587, filed Jan. 14, 2022, which is herein incorporated by reference.

BACKGROUND

Field of Invention

The present disclosure relates to a front light module and a foldable display device having the front light module.

Description of Related Art

In today's various consumer electronic product markets, foldable display panels have been widely used as display screens for electronic products, such as electronic paper. An electronic ink (e-ink) layer of a foldable display panel is mainly formed of an electrophoresis fluid and white and black charged particles doped in the electrophoresis fluid. The white and black charged particles are driven to move by applying a voltage to the electronic ink layer, such that each pixel displays a black color, a white color or a gray level. Since the foldable display panel utilizes an incident light (e.g., sunlight, indoor ambient light, or front light) that irradiates the electronic ink layer to achieve the purpose of display, a front light module can be set to adapt to the use restrictions of a dark environment.

However, in a traditional front light module, a light guide plate and optical adhesives at the upper and lower sides of the light guide plate do not have specific stress configuration. Even if the light guide plate has the characteristic of being bendable, its optical performance cannot be maintained under plural bending tests when the front light module is disposed above a flexible support plate and a foldable display panel, and a bright band will be formed to affect visual experience.

SUMMARY

One aspect of the present disclosure provides a front light module.

According to some embodiments of the present disclosure, a front light module includes a foldable light guide plate, a light source, an upper insulating layer, an upper optical adhesive layer, a lower insulating layer, and a lower optical adhesive layer. The foldable light guide plate has a light incident surface, a top surface, and a bottom surface. The top surface and the bottom surface adjoin the light incident surface. The light source faces toward the light incident surface. The upper insulating layer is located on the top surface of the foldable light guide plate. The upper optical adhesive layer is located on the upper insulating layer, and a storage modulus of the upper optical adhesive layer is less than a storage modulus of the upper insulating layer. The lower insulating layer is located on the bottom surface of the foldable light guide plate. The lower optical adhesive layer is located on a bottom surface of the lower insulating layer, and a storage modulus of the lower optical adhesive layer is less than a storage modulus of the lower insulating layer.

In some embodiments, the storage modulus of the upper optical adhesive layer and the storage modulus of the lower optical adhesive layer are less than 60 kPa.

In some embodiments, the storage modulus of the upper insulating layer and the storage modulus of the lower insulating layer are greater than 60 kPa.

In some embodiments, the upper optical adhesive layer and the lower optical adhesive layer have a same material, and the upper insulating layer and the lower insulating layer have a same material.

In some embodiments, the upper insulating layer and the lower insulating layer are optical clear adhesives.

In some embodiments, the upper insulating layer and the lower insulating layer are organic materials.

In some embodiments, the upper insulating layer and the lower insulating layer are silicone.

In some embodiments, the upper insulating layer and the lower insulating layer are inorganic materials.

In some embodiments, a material of the upper insulating layer and a material of the lower insulating layer are silicon oxide ($SiO_2$) or lanthanum fluoride ($LaF_3$).

In some embodiments, a thickness of the upper insulating layer and a thickness of the lower insulating layer are less than 5 μm.

In some embodiments, a thickness of the upper insulating layer and a thickness of the lower insulating layer are respectively less than a thickness of the upper optical adhesive layer and a thickness of the lower optical adhesive layer.

In some embodiments, a stress-optic coefficient of the upper insulating layer and a stress-optic coefficient of the lower insulating layer are less than $70 \times 10^{-12}$ $Pa^{-1}$.

One aspect of the present disclosure provides a foldable display device.

According to some embodiments of the present disclosure, a foldable display device includes a foldable display panel and the front light module. The front light module is located on the foldable display panel.

In some embodiments, the foldable display device further includes a support plate carrying the foldable display panel.

In some embodiments, the foldable display device further includes a touch panel located between the foldable display panel and the lower optical adhesive layer.

In some embodiments, the foldable display device further includes another lower optical adhesive layer located between the touch panel and the foldable display panel.

In some embodiments, the foldable display device further includes a cover layer located on the upper optical adhesive layer.

In the aforementioned embodiments of the present disclosure, since the upper insulating layer and the upper optical adhesive layer of the front light module are sequentially stacked on the top surface of the foldable light guide plate and the lower insulating layer and the lower optical adhesive layer are sequentially stacked on the bottom surface of the foldable light guide plate, the foldable light guide plate has multiple optical films that are disposed in a symmetrical arrangement. Moreover, the storage modulus of the upper optical adhesive layer is less than the storage modulus of the upper insulating layer, and the storage modulus of the lower optical adhesive layer is less than the storage modulus of the lower insulating layer. As a result of such a stress configuration, when the front light module is disposed above the foldable display panel, even after repeated bending and long-term use, it can still maintain its optical performance, which can avoid the formation of bright bands in a bending area, thereby improving visual experience to facilitate product competitiveness.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
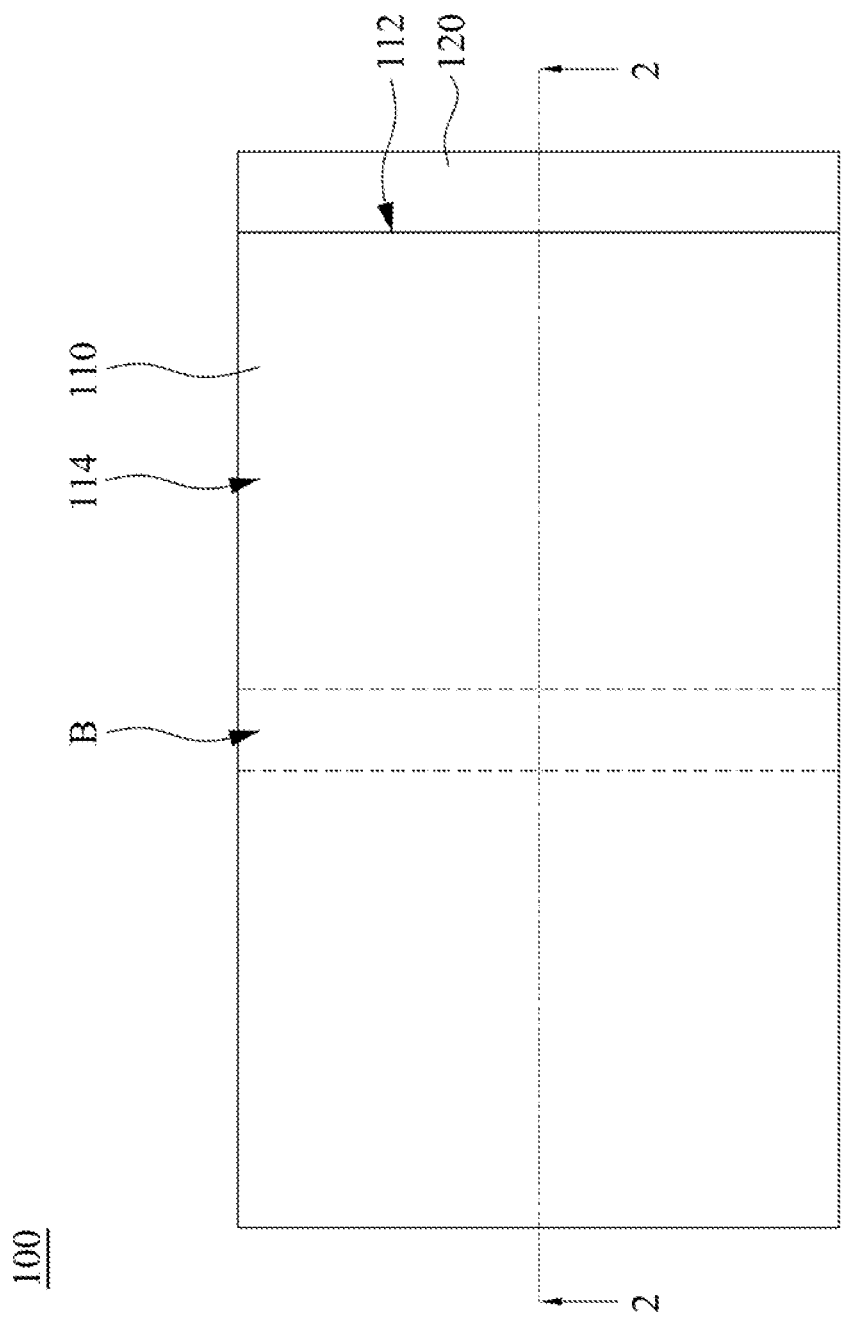
FIG. 1 is a top view of a front light module according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
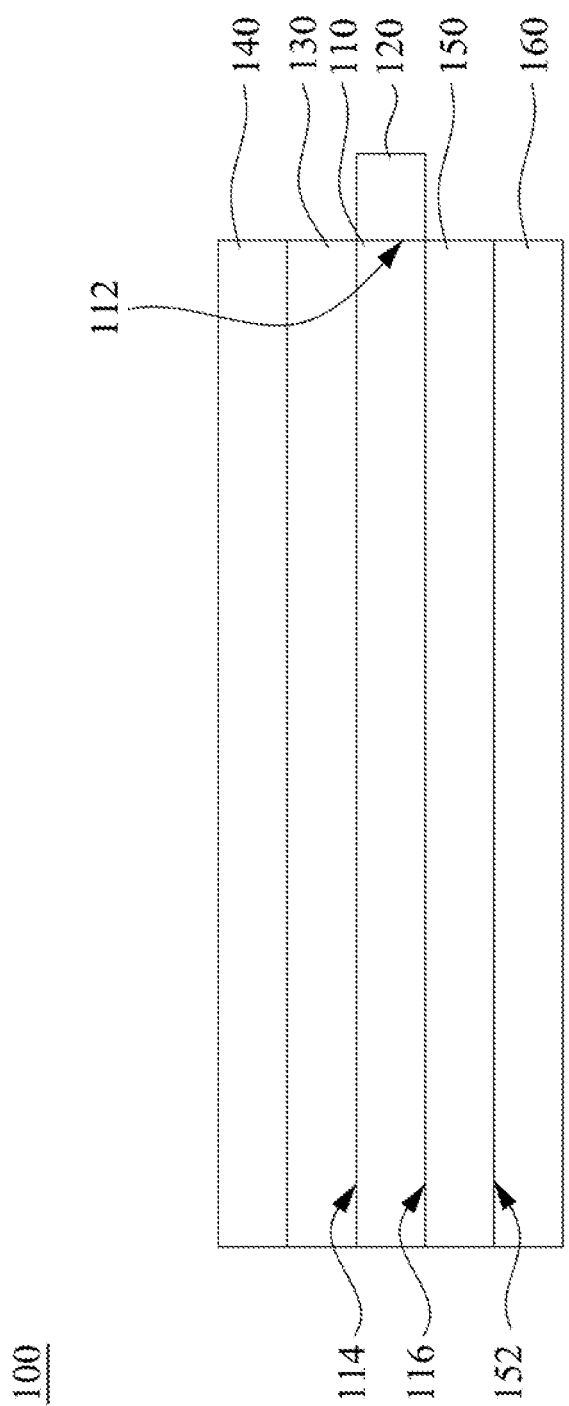
FIG. 2 is a cross-sectional view of the front light module taken along line 2-2 of FIG. 1.

FIG. 1 is a top view of a front light module 100 according to one embodiment of the present disclosure. FIG. 2 is a cross-sectional view of the front light module 100 taken along line 2-2 of FIG. 1. As shown in FIG. 1 and FIG. 2, the front light module 100 includes a foldable light guide plate 110, a light source 120, an upper insulating layer 130, an upper optical adhesive layer 140, a lower insulating layer 150, and a lower optical adhesive layer 160. The foldable light guide plate 110 has a light incident surface 112, a top surface 114, and a bottom surface 116, in which the top surface 114 and the bottom surface 116 adjoin the light incident surface 112. In this embodiment, the foldable light guide plate 110 is a side-entry light guide plate for front light. The foldable light guide plate 110 has a bending area B between the two dotted lines of FIG. 1. When the foldable light guide plate 110 is bent, the radius of curvature of the bending area B may be, but not limited to 15 mm. The light source faces toward the light incident surface. The upper insulating layer 130 is located on the top surface 114 of the foldable light guide plate 110. The upper optical adhesive layer 140 is located on the upper insulating layer 130, and the storage modulus of the upper optical adhesive layer 140 is less than the storage modulus of the upper insulating layer 130. The lower insulating layer 150 is located on the bottom surface 116 of the foldable light guide plate 110. The lower optical adhesive layer 160 is located on a bottom surface 152 of the lower insulating layer 150, and the storage modulus of the lower optical adhesive layer 160 is less than the storage modulus of the lower insulating layer 150.

In this embodiment, the upper insulating layer 130 and the lower insulating layer 150 are optical clear adhesives (OCA), and the storage modulus of the upper insulating layer 130 and the storage modulus of the lower insulating layer 150 are greater than 60 kPa at room temperature. Furthermore, the storage modulus of the upper optical adhesive layer 140 and the storage modulus of the lower optical adhesive layer 160 are less than 60 kPa at room temperature, and thus the upper optical adhesive layer 140 and the lower optical adhesive layer 160 have bendable characteristic. The upper optical adhesive layer 140 and the lower optical adhesive layer 160 may be respectively adhered to the upper insulating layer 130 and the lower insulating layer 150. The upper optical adhesive layer 140 and the lower optical adhesive layer 160 have the same material, and the upper insulating layer 130 and the lower insulating layer 150 have the same material. However, the upper optical adhesive layer 140 and the upper insulating layer 130 are optical adhesives respectively including different materials, and the lower optical adhesive layer 160 and the lower insulating layer 150 are optical adhesives respectively including different materials. Through the above configuration, the front light module 100 is bendable and can solve the problem of light leakage in the bending area B.

Since the upper insulating layer 130 and the upper optical adhesive layer 140 of the front light module 100 are sequentially stacked on the top surface 114 of the foldable light guide plate 110 and the lower insulating layer 150 and the lower optical adhesive layer 160 are sequentially stacked on the bottom surface 116 of the foldable light guide plate 110, the foldable light guide plate 110 has multiple optical films that are disposed in a symmetrical arrangement. Moreover, the storage modulus of the upper optical adhesive layer 140 is less than the storage modulus of the upper insulating layer 130, and the storage modulus of the lower optical adhesive layer 160 is less than the storage modulus of the lower insulating layer 150. As a result of such a stress configuration, when the front light module 100 is disposed above a foldable display panel, even after repeated bending and long-term use, it can still maintain its optical performance, which can avoid the formation of bright bands in the bending area B, thereby improving visual experience to facilitate product competitiveness.

Figure 3:
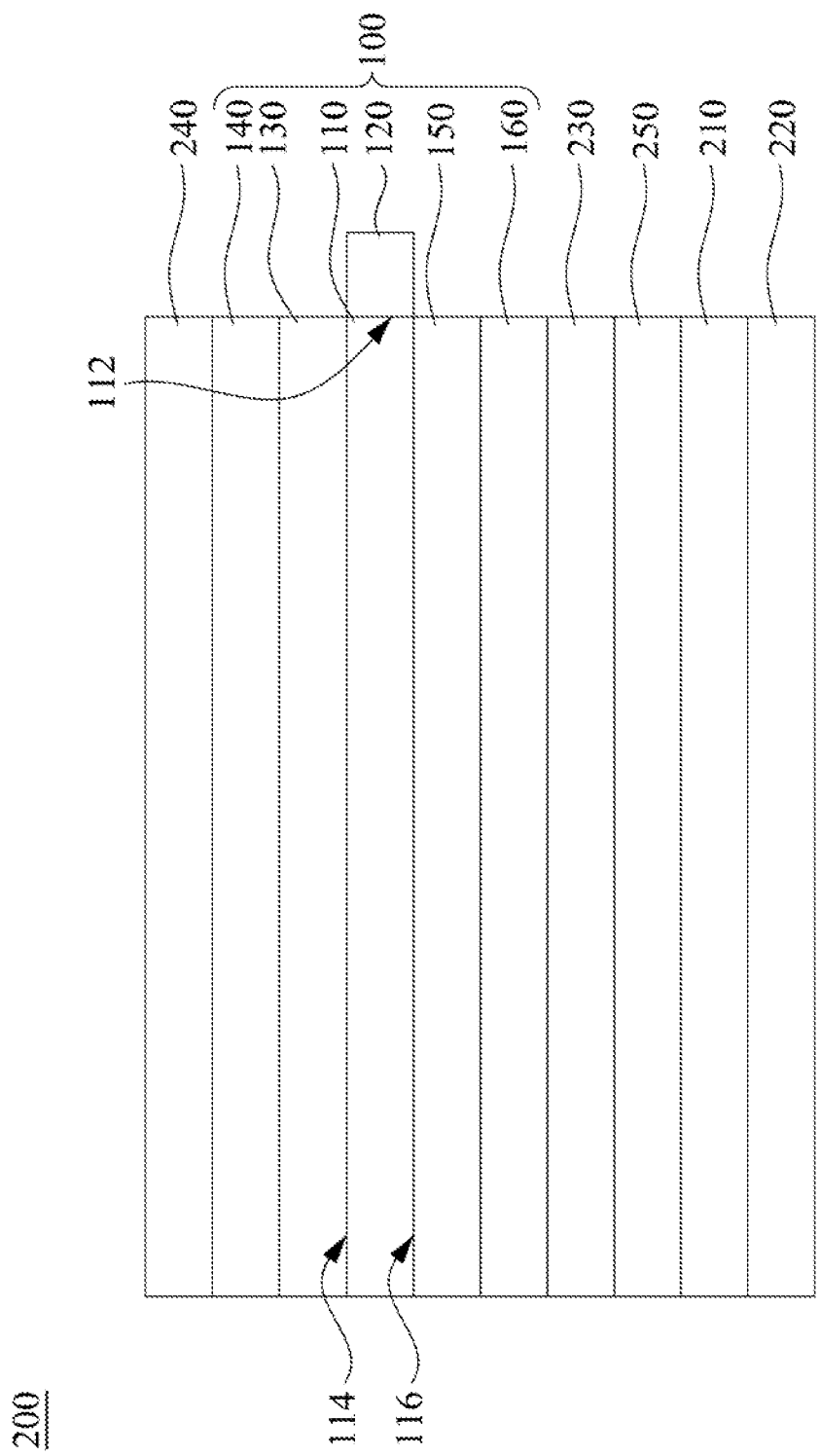
FIG. 3 is a cross-sectional view of a foldable display device having the front light module of FIG. 1.

FIG. 3 is a cross-sectional view of a foldable display device 200 having the front light module 100 of FIG. 1. As shown in FIG. 3, the foldable display device 200 includes a foldable display panel 210 and the aforementioned front light module 100. The front light module 100 is located on the foldable display panel 210. The foldable display panel 210 may be, but not limited to an electrophoretic display (EPD). When the light source 120 of the front light module 100 emits light, the light may irradiate outward from the bottom surface 116 of the foldable light guide plate 110, and the foldable display panel 210 receive the light, such that a display medium layer (e.g., an electronic ink) of the foldable display panel 210 can reflect the light to achieve the purpose of display. The front light module 100 not only can overcome the use restrictions of a dark environment for the foldable display device 200, but also can maintain its optical performance when it is bent along with the foldable display panel 210, which can avoid the formation of bright bands in the bending area B (see FIG. 1), thereby improving visual experience to facilitate product competitiveness.

In this embodiment, the foldable display device 200 may further include a support plate 220, a touch panel 230, another lower optical adhesive layer 250, and a cover layer 240. The support plate 220 carries the foldable display panel 210. The support plate 220 is flexible, and can be bent along with the foldable display panel 210. The touch panel 230 is located between the foldable display panel 210 and the lower optical adhesive layer 160 of the front light module 100, thereby providing a touch function for the foldable display device 200. In addition, the lower optical adhesive layer 250 is located between the touch panel 230 and the foldable display panel 210, and the material of the lower optical adhesive layer 250 may be the same as the material of each of the upper optical adhesive layer 140 and the lower optical adhesive layer 160 of the front light module 100, and thus the lower optical adhesive layer 250 has bendable characteristic. The cover layer 240 is located on the upper optical adhesive layer 140 to provide protection.

It is to be noted that the connection relationships, the materials, and the advantages of the elements described above will not be repeated in the following description. In the following description, other types of a front light module and a foldable display device will be described.

Figure 4:
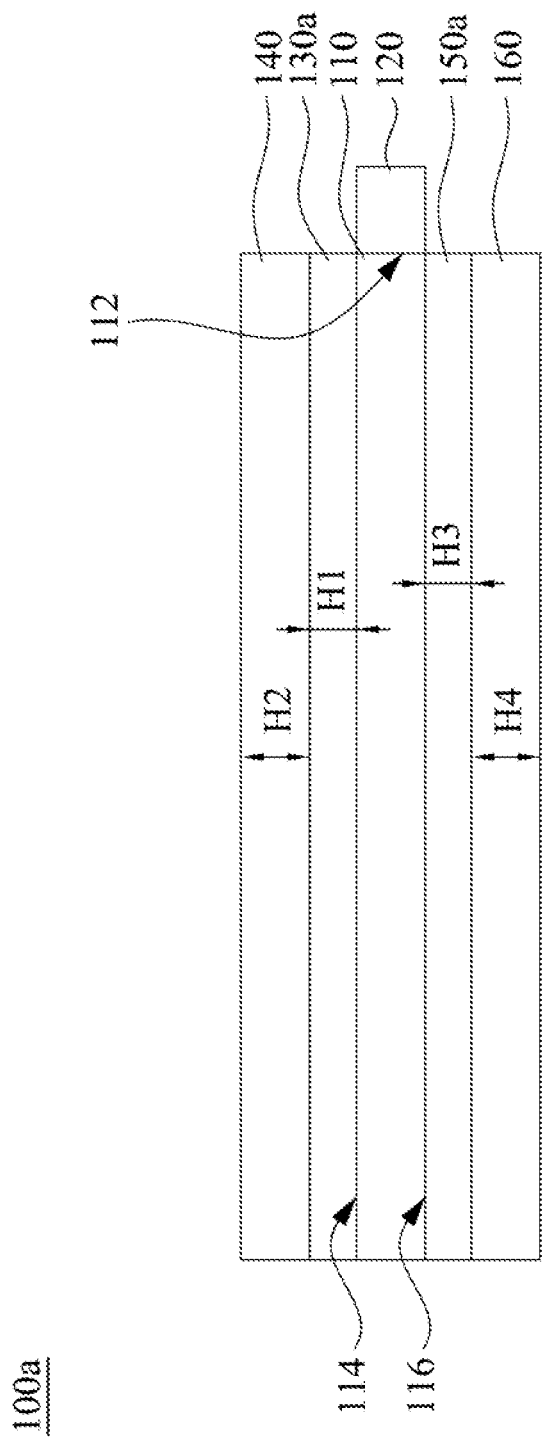
FIG. 4 is a cross-sectional view of a front light module according to another embodiment of the present disclosure.

FIG. 4 is a cross-sectional view of a front light module 100a according to another embodiment of the present disclosure. The front light module 100a includes the foldable light guide plate 110, the light source 120, an upper insulating layer 130a, the upper optical adhesive layer 140, a lower insulating layer 150a, and the lower optical adhesive layer 160. The difference between this embodiment and the embodiment of FIG. 2 is that the thickness H1 of the upper insulating layer 130a is less than the thickness H2 of the upper optical adhesive layer 140, and the thickness H3 of the lower insulating layer 150a is less than the thickness H4 of the lower optical adhesive layer 160. The upper insulating layer 130a and the lower insulating layer 150a can be respectively formed on the top surface 114 and the bottom surface 116 of the foldable light guide plate 110 by coating. In this embodiment, the thickness H1 of the upper insulating layer 130a and the thickness H3 of the lower insulating layer 150a may be less than 5 µm, and the stress-optic coefficient of the upper insulating layer 130a and the stress-optic coefficient of the lower insulating layer 150a are less than $70 \times 10^{-12}$ $Pa^{-1}$. Such a design may further improve bending performance.

In some embodiments, the upper insulating layer 130a and the lower insulating layer 150a may be organic materials, such as silicone, but the present disclosure is not limited in this regard. In alternative embodiments, the upper insulating layer 130a and the lower insulating layer 150a may be inorganic materials, such as silicon oxide ($SiO_2$) or lanthanum fluoride ($LaF_3$) but the present disclosure is not limited in this regard.

Figure 5:
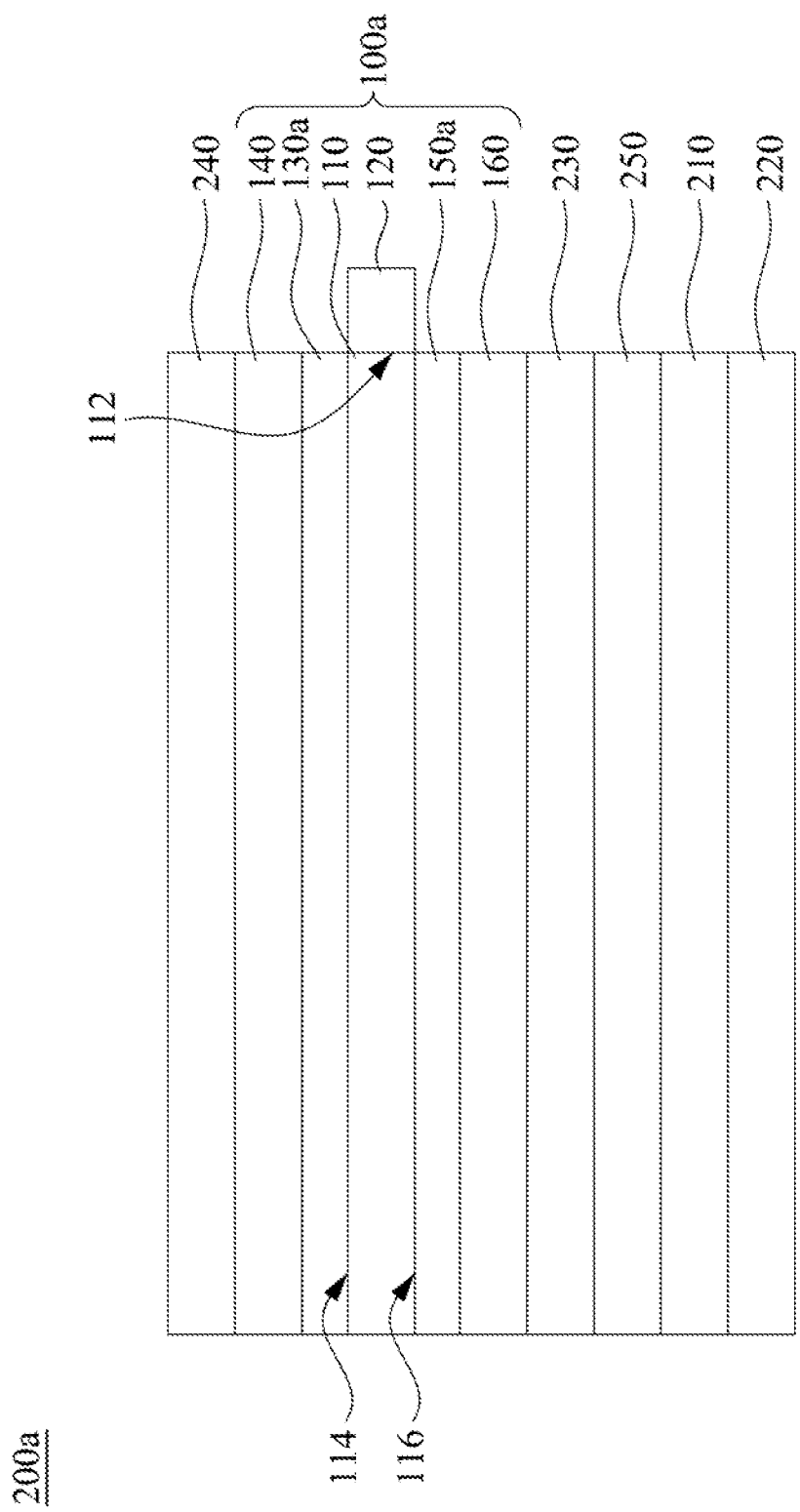
FIG. 5 is a cross-sectional view of a foldable display device having the front light module of FIG. 4.

FIG. 5 is a cross-sectional view of a foldable display device 200a having the front light module 100a of FIG. 4. As shown in FIG. 5, the foldable display device 200a includes the foldable display panel 210 and the aforementioned front light module 100a. The front light module 100a is located on the foldable display panel 210. The foldable display panel 210 may be, but not limited to an electrophoretic display (EPD). When the light source 120 of the front light module 100a emits light, the light may irradiate outward from the bottom surface 116 of the foldable light guide plate 110, and the foldable display panel 210 receive the light, such that a display medium layer (e.g., an electronic ink) of the foldable display panel 210 can reflect the light to achieve the purpose of display. The front light module 100a not only can overcome the use restrictions of a dark environment for the foldable display device 200a, but also can maintain its optical performance when it is bent along with the foldable display panel 210, which can avoid the formation of bright bands in the bending area B (see FIG. 1), thereby improving visual experience to facilitate product competitiveness.

In this embodiment, the foldable display device 200a may further include the support plate 220, the touch panel 230, another lower optical adhesive layer 250, and the cover layer 240. The configuration and the functions of the aforementioned layers are similar to those of FIG. 3. The support plate 220 carries the foldable display panel 210. The touch panel 230 is located between the foldable display panel 210 and the lower optical adhesive layer 160 of the front light module 100a. In addition, the lower optical adhesive layer 250 is located between the touch panel 230 and the foldable display panel 210, and the material of the lower optical adhesive layer 250 may be the same as the material of each of the upper optical adhesive layer 140 and the lower optical adhesive layer 160 of the front light module 100a, and thus the lower optical adhesive layer 250 has bendable characteristic. The cover layer 240 is located on the upper optical adhesive layer 140.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A front light module, comprising:
   a foldable light guide plate having a light incident surface, a top surface, and a bottom surface, wherein the top surface and the bottom surface adjoin the light incident surface;
   a light source facing toward the light incident surface;
   an upper insulating layer located on the top surface of the foldable light guide plate;
   an upper optical adhesive layer located on the upper insulating layer, wherein a storage modulus of the upper optical adhesive layer is less than a storage modulus of the upper insulating layer;
   a lower insulating layer located on the bottom surface of the foldable light guide plate; and
   a lower optical adhesive layer located on a bottom surface of the lower insulating layer, wherein a storage modulus of the lower optical adhesive layer is less than a storage modulus of the lower insulating layer, the upper insulating layer and the lower insulating layer are formed to be respectively in direct contact with the top surface and the bottom surface of the foldable light guide plate, and a thickness of the upper insulating layer and a thickness of the lower insulating layer are respectively less than a thickness of the upper optical adhesive layer and a thickness of the lower optical adhesive layer.

2. The front light module of claim 1, wherein the storage modulus of the upper optical adhesive layer and the storage modulus of the lower optical adhesive layer are less than 60 kPa.

3. The front light module of claim 1, wherein the storage modulus of the upper insulating layer and the storage modulus of the lower insulating layer are greater than 60 kPa.

4. The front light module of claim 1, wherein the upper optical adhesive layer and the lower optical adhesive layer have the same material, and the upper insulating layer and the lower insulating layer have the same material.

5. The front light module of claim 1, wherein the upper insulating layer and the lower insulating layer are optical clear adhesives.

6. The front light module of claim 1, wherein the upper insulating layer and the lower insulating layer are organic materials.

7. The front light module of claim 1, wherein the upper insulating layer and the lower insulating layer are silicone.

8. The front light module of claim 1, wherein the upper insulating layer and the lower insulating layer are inorganic materials.

9. The front light module of claim 1, wherein a material of the upper insulating layer and a material of the lower insulating layer are silicon oxide ($SiO_2$) or lanthanum fluoride ($LaF_3$).

10. The front light module of claim 1, wherein the thickness of the upper insulating layer and the thickness of the lower insulating layer are less than 5 μm.

11. The front light module of claim 1, wherein a stress-optic coefficient of the upper insulating layer and a stress-optic coefficient of the lower insulating layer are less than $70 \times 10^{-12}$ $Pa^{-1}$.

12. A foldable display device, comprising:

a foldable display panel; and the front light module of claim 1, wherein the front light module is located on the foldable display panel.

13. The foldable display device of claim 12, further comprising:

a support plate carrying the foldable display panel.

14. The foldable display device of claim 12, further comprising:

a touch Panel located between the foldable display panel and the lower optical adhesive layer.

15. The foldable display device of claim 14, further comprising:

another lower optical adhesive layer located between the touch panel and the foldable display panel.

16. The foldable display device of claim 12, further comprising:

a cover layer located on the upper optical adhesive layer.

* * * * *